US008762912B2

(12) United States Patent
Sun et al.

(10) Patent No.: US 8,762,912 B2
(45) Date of Patent: Jun. 24, 2014

(54) TIERED SCHEMATIC-DRIVEN LAYOUT SYNCHRONIZATION IN ELECTRONIC DESIGN AUTOMATION

(75) Inventors: Wern-Jieh Sun, Cupertino, CA (US); Haichun Chun, Sunnyvale, CA (US); Ernst W. Mayer, Cupertino, CA (US); Greg Woolhiser, San Jose, CA (US); Kuldeep Karlcut, Cupertino, CA (US)

(73) Assignee: Synopsys, Inc., Mountain View, CA (US)

( * ) Notice: Subject to any disclaimer, the term of this patent is extended or adjusted under 35 U.S.C. 154(b) by 539 days.

(21) Appl. No.: 12/610,054

(22) Filed: Oct. 30, 2009

(65) Prior Publication Data

US 2011/0107281 A1  May 5, 2011

(51) Int. Cl.
*G06F 9/455* (2006.01)
*G06F 17/50* (2006.01)

(52) U.S. Cl.
USPC ............ 716/111; 716/106; 716/136; 716/139

(58) Field of Classification Search
USPC .................................. 716/106, 111, 136, 139
See application file for complete search history.

(56) References Cited

U.S. PATENT DOCUMENTS

| | | | |
|---|---|---|---|
| 5,249,133 A * | 9/1993 | Batra | 716/112 |
| 6,189,132 B1 * | 2/2001 | Heng et al. | 716/122 |
| 6,425,112 B1 * | 7/2002 | Bula et al. | 716/52 |
| 6,473,881 B1 * | 10/2002 | Lehner et al. | 716/107 |
| 6,499,130 B1 * | 12/2002 | Lipton et al. | 716/52 |
| 6,505,323 B1 * | 1/2003 | Lipton et al. | 716/112 |
| 6,631,510 B1 * | 10/2003 | Betz et al. | 716/121 |
| 6,799,307 B1 * | 9/2004 | Lipton et al. | 716/112 |
| 6,988,253 B1 * | 1/2006 | Lipton et al. | 716/112 |
| 2004/0255258 A1 * | 12/2004 | Li | 716/8 |
| 2005/0132320 A1 * | 6/2005 | Allen et al. | 716/18 |
| 2006/0053400 A1 * | 3/2006 | Meyer et al. | 716/11 |
| 2006/0200789 A1 * | 9/2006 | Rittman | 716/19 |
| 2007/0079269 A1 * | 4/2007 | Corbeil et al. | 716/5 |
| 2008/0115102 A1 * | 5/2008 | Rittman | 716/19 |
| 2008/0133201 A1 * | 6/2008 | Guedon | 703/14 |
| 2009/0235213 A1 * | 9/2009 | Hao et al. | 716/4 |

* cited by examiner

*Primary Examiner* — Thuan Do
*Assistant Examiner* — Brian Ngo
(74) *Attorney, Agent, or Firm* — Park, Vaughan, Fleming & Dowler LLP; Chia-Hsin Suen

(57) ABSTRACT

Some embodiments provide a system that facilitates the creation of a layout from a schematic in an electronic design automation (EDA) application. During operation, the system performs a tiered comparison of the schematic and the layout. The tiered comparison includes a first tier that compares labels in the schematic and the layout. The tiered comparison also includes a second tier that compares first-level connectivity in the schematic and the layout. The tiered comparison further includes a third tier that determines a graph isomorphism between the schematic and the layout. After the tiered comparison is completed, the system provides a result of the tiered comparison to a user of the EDA application. Finally, the system enables repairs of mismatches in the result by the user through a graphical user interface (GUI) associated with the EDA application.

24 Claims, 7 Drawing Sheets

TIERED SCHEMATIC-DRIVEN LAYOUT SYNCHRONIZATION IN ELECTRONIC DESIGN AUTOMATION

BACKGROUND

1. Field

This disclosure relates to electronic design automation (EDA). More specifically, this disclosure relates to techniques for tiered synchronization of schematics and layouts.

2. Related Art

Integrated circuit design often involves the use of schematics, which typically contain logical representations of components and wires in integrated circuits. EDA tools are typically used for creating schematics. For example, a schematic editor may allow a designer to create an electronic schematic of an integrated circuit. The electronic schematic may then be used by other EDA tools to simulate the operation of the integrated circuit, create a layout of the integrated circuit, and/or detect errors in the schematic.

In particular, EDA tools may use schematic-driven-layout (SDL) to automatically generate and place components in a layout based on a reference schematic for creating the layout. Once the layout is created, the EDA tools may perform a layout-versus-schematic (LVS) check to ensure that the layout matches the schematic. Any mismatches found in the LVS check may be presented to the designer so that the designer may modify the layout and/or schematic to repair the mismatches. For example, LVS checks may locate errors such as shorts, opens, component mismatches, missing components, and/or property errors in the layout. The designer may use the errors to modify the layout until the layout passes the LVS check.

However, conventional SDL and LVS mechanisms typically include a tradeoff between performance and speed. For example, an LVS check based on graph labeling and/or graph isomorphism may perform a thorough comparison of the layout and schematic but may also be computationally expensive. On the other hand, an efficient LVS check that requires components in the layout and schematic to be "label coherent" may be of limited use after modifications are made to the layout and/or schematic.

Hence, integrated circuit design may be improved through mechanisms that increase both the speed and accuracy of synchronization between schematics and layouts.

SUMMARY

Some embodiments provide a system that facilitates the creation of a layout from a schematic in an electronic design automation (EDA) application. During operation, the system performs a tiered comparison of the schematic and the layout. The tiered comparison includes a first tier that compares labels in the schematic and the layout. The tiered comparison also includes a second tier that compares first-level connectivity in the schematic and the layout. The tiered comparison further includes a third tier that determines a graph isomorphism between the schematic and the layout. After the tiered comparison is completed, the system provides a result of the tiered comparison to a user of the EDA application. The system also enables repairs of mismatches in the result by the user through a graphical user interface (GUI) associated with the EDA application.

In some embodiments, the system also automatically generates a portion of the layout using the schematic.

In some embodiments, automatically generating the portion of the layout involves automatically placing a component in the layout based at least on an optimization goal associated with the layout.

In some embodiments, enabling repairs of mismatches by the user through the GUI involves at least one of enabling automatic correction of the mismatches through the GUI and marking the mismatches in the layout.

In some embodiments, the first tier involves comparing components in the schematic and the layout using at least one of a component name, a terminal set, and a signal net.

In some embodiments, the second tier involves at least one of:
 (i) generating a source graph from the schematic and a target graph from the layout;
 (ii) comparing node counts and edge counts from the source graph and the target graph;
 (iii) comparing edge-incidence counts from the source graph and the target graph; and
 (iv) using shared cell masters and the edge-incidence counts to match cell instances in the schematic and the layout.

In some embodiments, the third tier involves performing an eigenspace decomposition of the source graph and the target graph, and comparing eigenvalues and eigenvectors from the eigenspace decomposition.

In some embodiments, the tiered comparison is a full comparison or an incremental comparison.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
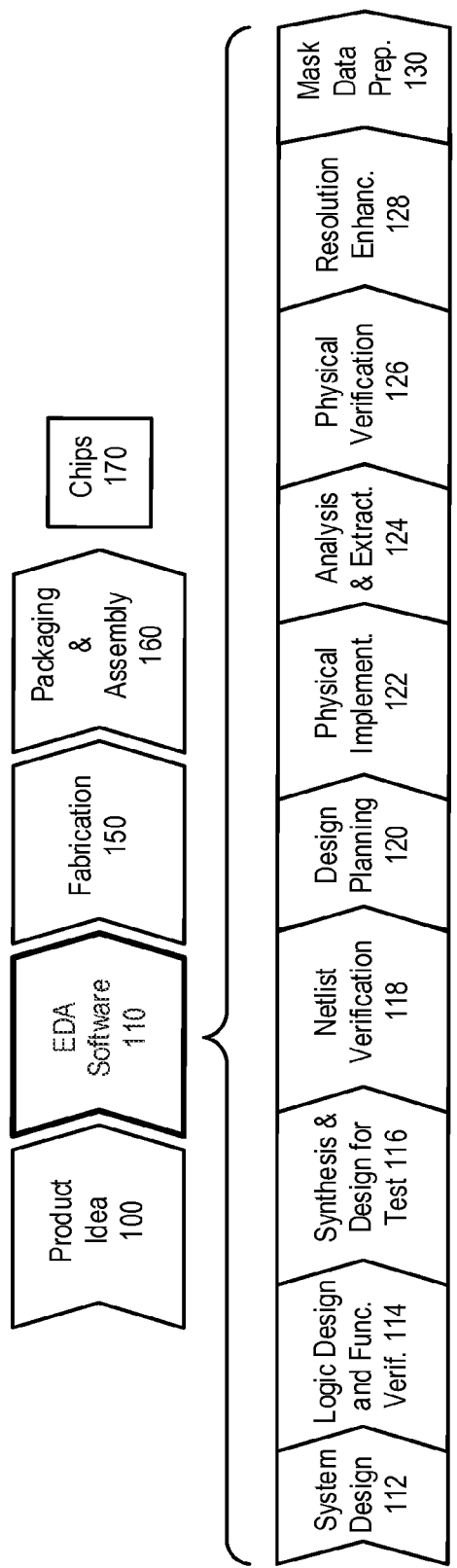
FIG. 1 shows a workflow associated with the design and fabrication of an integrated circuit in accordance with an embodiment.

FIG. 1 shows a workflow associated with the design and fabrication of an integrated circuit in accordance with an embodiment. The workflow may begin with a product idea (step 100), which may be realized using an integrated circuit that is designed using an electronic design automation (EDA) process (step 110). After the integrated circuit design is finalized, the design may undergo a fabrication process (step 150) and a packaging and assembly process (step 160) to produce chips 170.

The EDA process (step 110) includes steps 112-130, which are described below for illustrative purposes only and are not meant to limit the present invention. Specifically, the steps may be performed in a different sequence than the sequence described below.

During system design (step 112), circuit designers may describe the functionality to be implemented in the integrated circuit. They may also perform what-if planning to refine functionality, check costs, etc. Hardware-software architecture partitioning may also occur at this stage. Exemplary EDA software products from Synopsys, Inc. that may be used at this step include Model Architect, Saber®, System Studio, and DesignWare®.

During logic design and functional verification (step 114), the VHDL or Verilog code for modules in the system may be written and the design may be checked for functional accuracy, (e.g., the design may be checked to ensure that it produces the correct outputs). Exemplary EDA software products from Synopsys, Inc. that may be used at this step include VCS®, Vera®, DesignWare®, Magellan™, Formality®, ESP and Leda® for digital verification and HSPICE®, HSIM®, Nanosim™ for analog verification.

During synthesis and design for test (step 116), the VHDL/Verilog may be translated to a netlist. Further, the netlist may be optimized for the target technology, and tests may be designed and implemented to check the finished chips. Exemplary EDA software products from Synopsys, Inc. that may be used at this step include Design Compiler®, Physical Compiler®, Test Compiler, Power Compiler™, FPGA Compiler, TetraMAX®, and DesignWare®.

During netlist verification (step 118), the netlist may be checked for compliance with timing constraints and for correspondence with the VHDL/Verilog source code. Exemplary EDA software products from Synopsys, Inc. that may be used at this step include Formality®, PrimeTime®, and VCS®.

During design planning (step 120), an overall floorplan for the chip may be constructed and analyzed for timing and top-level routing. Exemplary EDA software products from Synopsys, Inc. that may be used at this step include Astro™ and IC Compiler products.

During physical implementation (step 122), circuit elements may be positioned in the layout (placement) and may be electrically coupled (routing). Exemplary EDA software products from Synopsys, Inc. that may be used at this step include Astro™ and IC Compiler products.

During analysis and extraction (step 124), the circuit's functionality may be verified at a transistor level and parasitics may be extracted. Exemplary EDA software products from Synopsys, Inc. that may be used at this step include AstroRail™, PrimeRail, PrimeTime®, and Star-RCXTT™.

During physical verification (step 126), the design may be checked to ensure correctness for manufacturing, electrical issues, lithographic issues, and circuitry. Hercules™ is an exemplary EDA software product from Synopsys, Inc. that may be used at this step.

During resolution enhancement (step 128), geometric manipulations may be performed on the layout to improve manufacturability of the design. Exemplary EDA software products from Synopsys, Inc. that may be used at this step include Proteus/ProGen, ProteusAF, and PSMGen.

During mask data preparation (step 130), the design may be "taped-out" to produce masks that are used during fabrication.

Figure 2:
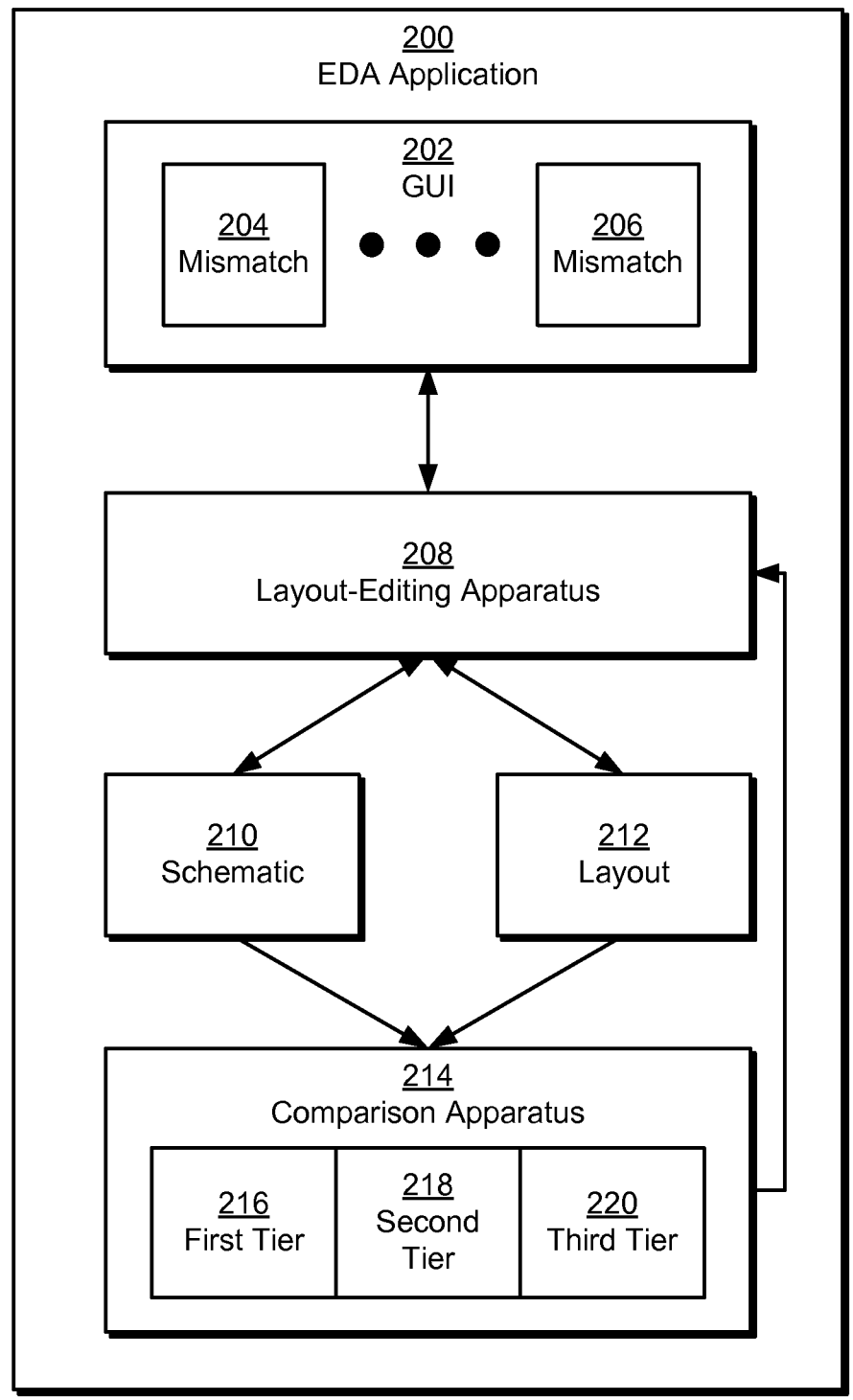
FIG. 2 shows an electronic design automation (EDA) application in accordance with an embodiment.

FIG. 2 shows an EDA application 200 in accordance with an embodiment. As shown in FIG. 2, EDA application 200 includes a graphical user interface (GUI) 202, a layout-editing apparatus 208, a schematic 210, a layout 212, and a comparison apparatus 214. Each of these components is described in further detail below.

Schematic 210 may correspond to an abstract representation of an integrated circuit that uses graphical objects to represent components in the integrated circuit. For example, schematic 210 may contain symbols that represent resistors, capacitors, transistors, logic gates, and/or other components in an analog integrated circuit. The graphical objects may additionally be connected by lines that represent electrical couplings between the components. In other words, the functionality of the integrated circuit may be illustrated by the components and interconnections within schematic 210.

Furthermore, schematic 210 may be created using EDA application 200. For example, EDA application 200 may include a schematic editor, such as a Custom Designer Schematic Editor from Synopsys, Inc., that allows a user to create schematic 210 on a computer system. EDA application 200 may also allow the user to simulate and/or verify schematic 210. In particular, simulation apparatus 212 may allow the user to test the correctness and/or performance of schematic 210 through transistor simulation, logic simulation, and/or behavioral simulation of schematic 210. For example, EDA application 200 may include an HSPICE (HSPICE™ is a registered trademark of Synopsys, Inc.) simulator, Custom-Sim (CustomSim™ is a registered trademark of Synopsys, Inc.) simulator, Custom Designer Simulation and Analysis Environment, and/or WaveView Analyzer from Synopsys, Inc.

Once the correctness and/or performance of schematic 210 are verified, schematic 210 may be used by EDA application 200 to create layout 212. In particular, layout-editing apparatus 208 may include schematic-driven layout (SDL) mechanisms that automatically generate a portion of layout 212 from schematic 210. For example, layout-editing apparatus 208 may correspond to a Custom Designer Layout Editor from Synopsys, Inc. that instantiates cell instances of components in layout 212 based on the presence of the cell instances in schematic 210.

On the other hand, the user may manually add cell instances to layout 212 through layout-editing apparatus 208 and/or GUI 202. For example, the user may create the cell instances within layout 212 by drawing graphical objects corresponding to the cell instances within GUI 202 and/or by providing library/cell/view information for the cell instances to layout-editing apparatus 208.

In one or more embodiments, EDA application 200 enables template-based instantiation of cell instances in layout 212. More specifically, the user may add a cell instance to layout 212 by using a template associated with the cell instance in GUI 202 to parameters for the cell instance using GUI elements in the template. In addition, EDA application 200 may implement an application-programming interface (API) that allows the user to create custom templates in the form of module generators and use the templates to create and configure cell instances in layout 212. For example, the user may write a module generator using an OpenAccess C++ API supported by EDA application 200 and provide the module generator to EDA application 200. The module generator may be loaded into the memory space of EDA application 200 and provided as a template option within GUI 202 during generation of cell instances in layout 212. The user may then select the template option to control parameters used by the module generator to create cell instances.

After a component (e.g., cell instances) is created, layout-editing apparatus 208 may assist the user with the placement of the component in layout 212. First, layout-editing apparatus 208 may automatically place components in layout 212 based at least on an optimization goal associated with the layout. In other words, the automatic placement of components in layout 212 may be based on one or more factors that include the optimization goal. For example, layout-editing apparatus 208 may place components in layout 212 such that the components meet performance, size, compaction, wire length, design-rule-checking, and/or manufacturability goals associated with layout 212.

Alternatively, if the user chooses to manually place a component, layout-editing apparatus 208 may display an indicator (e.g., an arrow) within GUI 202 representing a suitable location for the component with respect to a particular optimization goal. Layout-editing apparatus 208 may further display a computed value associated with the optimization goal at or near the indicator. For example, layout-editing apparatus 208 may assist the user with placing a component to optimize wire length by displaying arrows at three different locations that minimize wire length for the component in layout 212, along with a calculation of an estimated wire length at each location.

Layout-editing apparatus 208 may also provide connectivity information from schematic 210 to assist the user with routing between the cell instances in layout 212. For example, layout-editing apparatus 208 may draw lines between graphical objects in GUI 202 to represent connections that should be made between cell instances in layout 212 to match connections in schematic 210.

Furthermore, layout-editing apparatus 208 may utilize multithreading and/or idle cores to increase performance by pre-computing routing solutions before the user finalizes routing actions. For example, layout-editing apparatus 208 may begin computing routes from a source point upon receiving the source point from the user. Furthermore, the finiteness of possible routes from the source point may allow layout-editing apparatus 208 to pre-compute the best route to each possible destination point before the user specifies the destination point. Because the best route to the destination point is already available by the time the user specifies the destination point, the user may experience little to no lag in routing from the source point to the destination point.

EDA application 200 may additionally include functionality to perform layout-versus-schematic (LVS) checks that detect structural and/or functional mismatches between layout 212 and schematic 210. Furthermore, the results of the LVS checks may be provided to the user to facilitate the creation of layout 212 from schematic 210. For example, mismatches found in an LVS check may be displayed to the user through GUI 202 to allow the user to correct the mismatches.

In one or more embodiments, comparison apparatus 214 provides LVS checking as a tiered comparison of schematic 210 and layout 212. As discussed below, the tiered comparison may provide a solution to the tradeoff between performance and speed in conventional LVS checking mechanisms.

As shown in FIG. 2, comparison apparatus 214 includes a first tier 216, a second tier 218, and a third tier 220 of comparison. Comparison apparatus 214 may begin the tiered comparison with first tier 216, which compares labels in schematic 210 and layout 212. For example, comparison apparatus 214 may perform first tier 216 by examining lexically sorted netlists associated with schematic 210 and layout 212 for matches between component names, terminal sets, and/or signal nets. Because label-based comparison is computationally efficient, first tier 216 may quickly verify consistency between schematic 210 and layout 212 as long as schematic 210 and layout 212 are "label coherent." First tier 216 is discussed in further detail below with respect to FIG. 4.

However, first tier 216 may not produce meaningful mismatch information if schematic 210 and layout 212 are not "label coherent." For example, first tier 216 may be ineffective if modifications to layout 212 by the user involve changes to the labels or if the labels in schematic 210 and/or layout 212 are corrupted. As a result, comparison apparatus 214 may continue the tiered comparison with second tier 218, which compares first-level connectivity in schematic 210 and layout 212.

Second tier 218 may begin by generating a source graph from schematic 210 and a target graph from layout 212. In particular, second tier 218 may map cell instances in schematic 210 and layout 212 to nodes in the source and target graphs and connectivity in schematic 210 and layout 212 to edges in the source and target graphs. In other words, the source and target graphs may correspond to graph-theoretic representations of schematic 210 and layout 212, respectively.

Second tier 218 may then perform a series of comparisons of first-level connectivity in the source and target graphs. First, second tier 218 may compare node counts (e.g., number of nodes) and edge counts (e.g., number of edges) from the source and target graphs. If the node count and edge count from the source graph do not equal the node count and edge count from the target graph, schematic 210 and layout 212 do not match.

If the node and edge counts are equal, second tier 218 may proceed with a comparison of edge-incidence counts from the source and target graphs. Each edge-incidence count may represent the number of edges incident on a node. Second tier 218 may also generate histograms of edge-incident counts from the source and target graphs and compare the histograms to detect mismatches between the nodes. As with the node and edge counts, non-matching histograms from the source and target graphs may indicate the presence of mismatches between schematic 210 and layout 212.

If the histograms match, second tier 218 may use shared cell masters to match cell instances in schematic 210 and layout 212. In particular, second tier 218 may examine lists of library/cell/view strings of cell masters to find groups of cell instances that share a particular cell master. Second tier 218 may then attempt to match cell instances in schematic 210 and layout 212 using the shared cell master information and the edge-incidence counts. For example, layout 212 cell instances L1, L5, and L7 may share the cell master "generic90RF/n_4t/layout," while schematic 210 cell instances S3 and S9 may share the corresponding cell master "generic90RF/n_4t/schematic." Moreover, L1 and S9 have seven incident nets each, while L5, L7, and S3 have edge-incidence counts of 3, 5, and 8, respectively. Consequently, the only possible match between cell instances of cell masters in the "generic90RF" library and the "n_4t" cell may be between L1 and S9. Second tier is discussed in further detail below with respect to FIG. 5.

The use of node counts, edge counts, edge-incidence counts, and shared cell masters by second tier 218 may resolve all or most non-name-based mismatches found in first tier 216. If any unresolved mismatches remain after second tier 218, comparison apparatus 214 may proceed to third tier 220, which determines a graph isomorphism between schematic 210 and layout 212. To determine the graph isomorphism, third tier 220 may perform an eigenspace decomposition of the source graph and the target graph and then compare eigenvalues and eigenvectors from the eigenspace decomposition. If the eigenvalues and/or eigenvectors of the target graph are permutations of eigenvalues and/or eigenvectors of the source graph, a graph isomorphism is found and schematic 210 and layout 212 are consistent. If the eigenvalues and/or eigenvectors do not match, the source and target graphs are not isomorphic and schematic 210 and layout 212 do not match. Third tier 220 is discussed in further detail below with respect to FIG. 6.

After the tiered comparison is complete, the result of the tiered comparison is provided to the user. For example, the result may be displayed to the user through GUI 202 and/or stored in a log file that is accessible to the user.

If the result does not contain mismatches, layout 212 may pass the LVS check, and the user may proceed with the creation and/or verification of layout 212. If the result contains mismatches, GUI 202 may enable repairs of the mismatches by the user. To facilitate repairs of mismatches, GUI 202 may mark the mismatches in schematic 210 and/or layout 212 and/or display a text-based list of the mismatches and associated error information in a separate window.

GUI 202 may also enable automatic correction of the mismatches. For example, GUI 202 may allow the user to select one or more mismatches in layout 212 and/or in the text-based list using a cursor, keyboard, and/or other input device. The mismatches may be internally flagged in the netlists of schematic 210 and layout 212 by layout-editing apparatus 208. The user may then select a button in GUI 202 that triggers a repair of the mismatches by layout-editing apparatus 208 and a removal of the markers from the display of layout 212 in GUI 202. Along the same lines, GUI 202 may provide a button that triggers a batch correction of all mismatches by layout-editing apparatus 208.

In one or more embodiments, the tiered comparison performed by comparison apparatus 214 corresponds to a full comparison or an incremental comparison. In particular, a full comparison may be performed the first time layout 212 is compared with schematic 210 (e.g., after SDL). Furthermore, the full comparison may establish correspondence between components in schematic 210 and components in layout 212. As a result, subsequent local changes to schematic 210 and/or layout 212 (e.g., Engineering Change Orders (ECOs), parameter changes to low-level cell instances, modifications to the design of layout 212) may be verified using an incremental comparison of the affected components instead of a full comparison of schematic 210 and layout 212. For example, an ECO that changes the value of a parameter in schematic 210 may be addressed by comparing cell instances affected by the parameter change in schematic 210 with analogous cell instances in layout 210. As with the full comparison, mismatches found in the incremental comparison may be provided to the user and/or highlighted in schematic 210 and/or layout 212. The user may manually correct the mismatches or trigger an automatic correction of the mismatches through GUI 202.

In one or more embodiments, EDA application 200 synchronizes schematic 210 and layout 212 by continuously performing tiered comparisons and responding to mismatches found in the tiered comparisons. In other words, EDA application 200 may facilitate the creation of layout 212 from schematic 210 by continually using SDL and LVS to update and verify layout 212 during the design of layout 212. In addition, synchronization may be triggered by changes to either schematic 210 or layout 212. For example, a tiered comparison may be performed after the user changes a connection in layout 212 to determine the impact the change may have on consistency between schematic 210 and layout 212.

However, synchronization after every modification event in EDA application 200 may negatively impact performance. Instead, groups of modification events within EDA application 200 may be wrapped in transactions. When a transaction completes, the modification events are processed by filtering out events that are not relevant to synchronization and/or LVS checking. The remaining events may then be handled by processing the modifications associated with the events, then performing a full comparison of schematic 210 and layout 212. Mismatches found in the full comparison may be addressed immediately through automatic correction or user notification. On the other hand, responses to the mismatches may be delayed until the responses are triggered (e.g., by the user, by layout-editing apparatus 208, etc.). Such transaction-based synchronization may reduce latency in EDA application 200 while ensuring timely responses to important modification events.

Transaction-based synchronization may additionally improve performance by using incremental netlist updates in lieu of full netlist generation during processing of modifications to schematic 210 and/or layout 212. The modifications may be tracked in tree data structures that image the hierarchy of schematic 210 and layout 212. Each node of the tree may include an "isModified" flag that is set if the corresponding component has been modified. The node may also contain an "isInterfaceModified" flag that is set if the modification to the node is related to the interface of the component (e.g., terminals, globals, etc.). Finally, the node may include an "isChildrenModified" flag that is set if a child node of the node has been modified; when a node is flagged as "isModified," all nodes on the path from the node to the root node are flagged as "isChildrenModified."

When a netlist update is triggered (e.g., by a completed transaction, by the user, etc.), a top-down traversal of the trees is performed. If a node is not flagged as "isModified" or "isChildrenModified," the subtree corresponding to the node is omitted from the traversal. The traversal may thus follow paths of nodes flagged as "isModified" and/or "isChildrenModified," with nodes flagged as "isModified" used to incrementally update the netlist(s).

Consequently, EDA application 200 allows layout 212 to be created using SDL mechanisms that facilitate the custom generation and automatic placement of components. EDA application 200 may further verify layout 212 using a tiered comparison with schematic 210 that is both efficient and comprehensive. Finally, the creation of layout 212 may be facilitated through incremental comparisons, transaction-based synchronization, and incremental netlist updates that increase both performance and functionality in EDA application 200.

Figure 3:
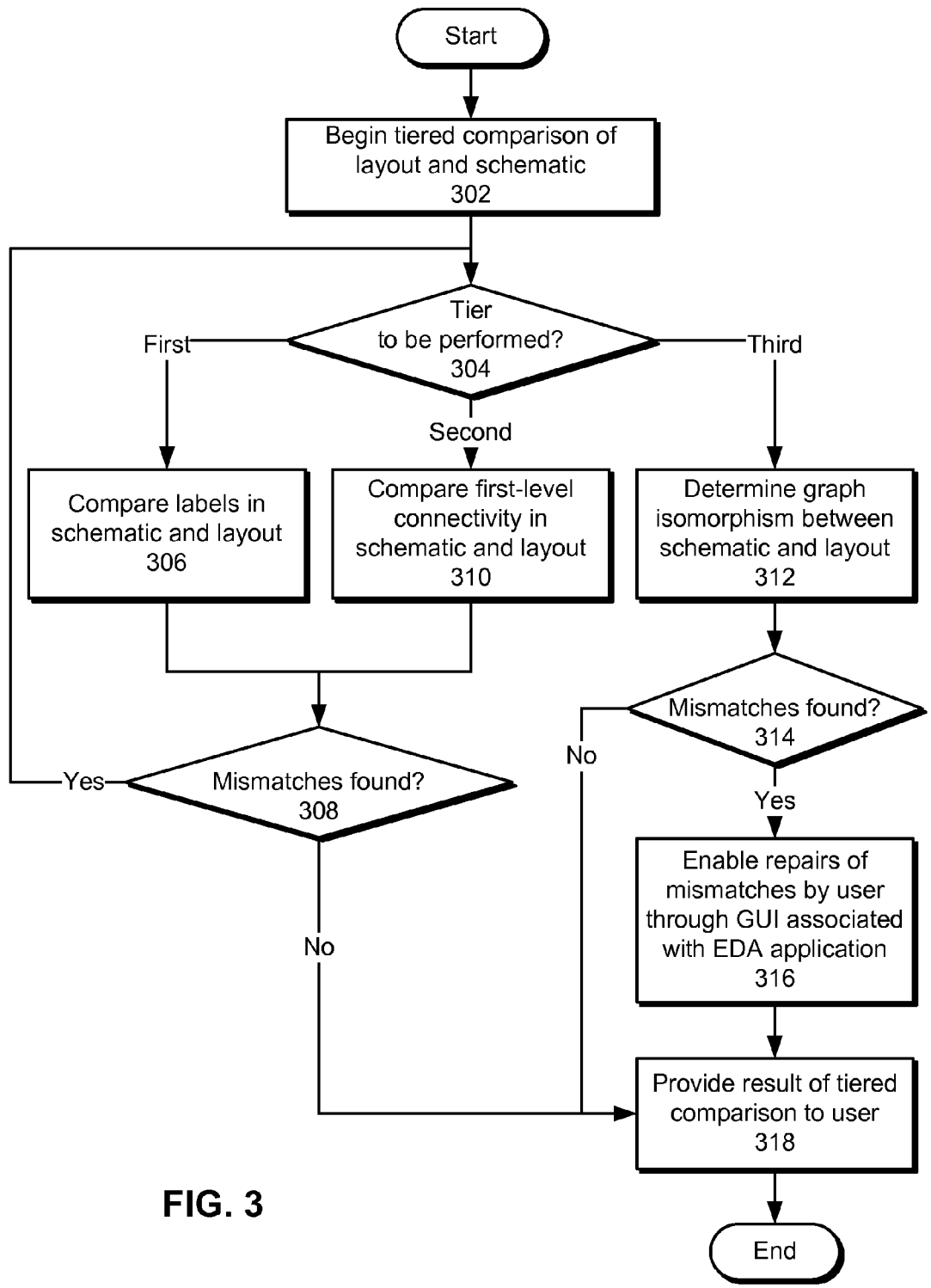
FIG. 3 shows a flowchart illustrating the process of facilitating the creation of a layout from a schematic in an EDA application in accordance with an embodiment.

FIG. 3 shows a flowchart illustrating the process of facilitating the creation of a layout from a schematic in an EDA application in accordance with an embodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, a tiered comparison of the layout and schematic is started (operation 302). For example, the tiered comparison may be triggered by a user of the EDA application, or by the completion of a transaction containing a set of modification events in the EDA application. The tiered comparison may correspond to an LVS check that uses one of three tiers (operation 304) at a time to compare the layout and schematic.

A first tier that compares labels in the schematic and layout (operation 306) may be performed to detect mismatches (operation 308) in component names, terminal sets, and/or signal nets. If no mismatches are found in the first tier, the tiered comparison concludes with the result that the layout matches the schematic, and the result is provided to the user (operation 318). However, if mismatches are found in the first tier, the tiered comparison may continue (operation 304) with a second tier that compares first-level connectivity in the schematic and layout (operation 310) to detect mismatches (operation 308) in node counts, edge counts, cell-incidence counts, and/or shared cell masters. As with the first tier, if no mismatches are found, the tiered comparison results in an LVS verification of the layout and the result is provided to the user (operation 318).

If mismatches are found in the second tier, the tiered comparison may progress (operation 304) to a third tier that determines a graph isomorphism between the schematic and layout (operation 312). The assessed graph isomorphism may definitively indicate the presence or absence of mismatches (operation 314) in the layout and schematic. If a graph isomorphism is found, the tiered comparison concludes with a mismatch-free result that is provided to the user (operation 318). However, if the schematic and layout are not isomorphic, the result of the tiered comparison contains mismatches, and repairs of the mismatches by the user are enabled through a GUI associated with the EDA application (operation 316). In particular, the GUI may provide the result to the user (operation 318) by displaying markers corresponding to the mismatches in the layout and/or schematic and/or by displaying error information associated with the mismatches to the user. The GUI may also display buttons, widgets, and/or other GUI elements to the user that enable automatic correction of the mismatches.

Figure 4:
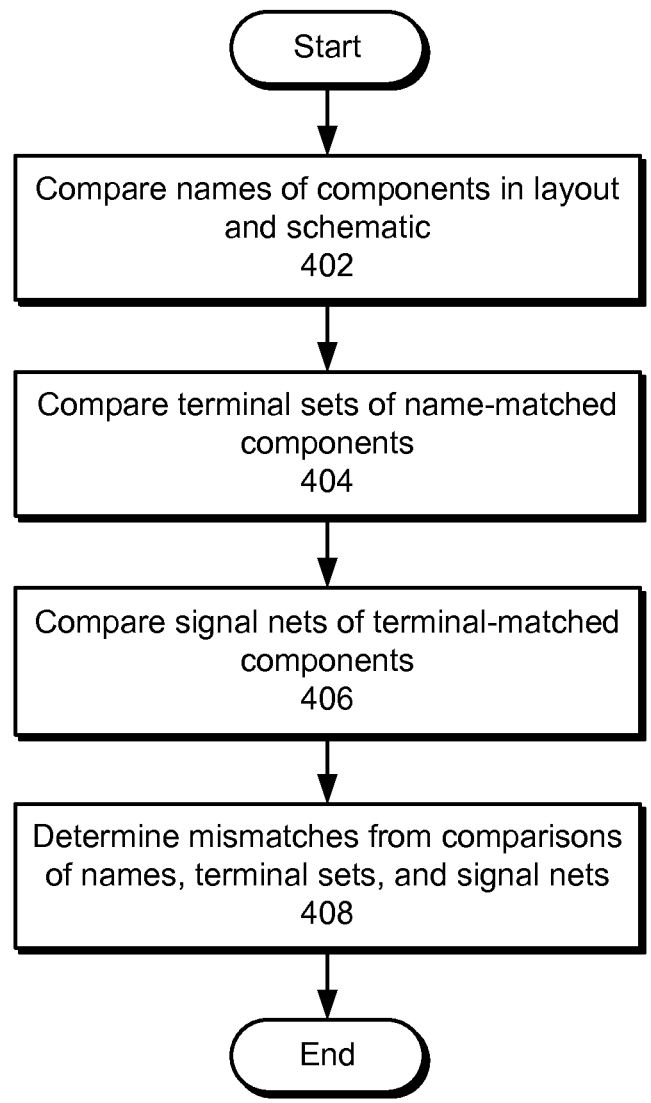
FIG. 4 shows a flowchart illustrating the process of performing a first tier in a tiered comparison of a schematic and a layout in accordance with an embodiment.

FIG. 4 shows a flowchart illustrating the process of performing a first tier in a tiered comparison of a schematic and a layout in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

The first tier begins by comparing names of components in the layout and schematic (operation 402). For example, the first tier may compare component names between lexically sorted netlists associated with the layout and schematic. The first tier may also remove name-prefix duplicates associated with m-factored cell instances and/or folded instances in the layout prior to making the comparison.

Next, the first tier compares terminal sets of name-matched components (operation 404) to narrow the match candidates between components with matching names. For example, a match may be found between multiple layout and schematic cell instances named "sym1" if only one layout cell instance named "sym1" contains a terminal set that matches the terminal set of a schematic cell instance named "sym1."

The first tier may then compare signal nets of terminal-matched components (operation 406) to further reduce the match candidates. In other words, the first tier may continue applying label-based comparisons to match candidates until matches are made between layout cell instances and schematic cell instances. Conversely, the comparisons of names, terminal sets, signal nets, and/or other labels may also be used to determine label-based mismatches (operation 408) between the layout and schematic. A second tier in the tiered comparison may then be used to resolve some or all of the mismatches by comparing first-level connectivity in the layout and schematic.

Figure 5:
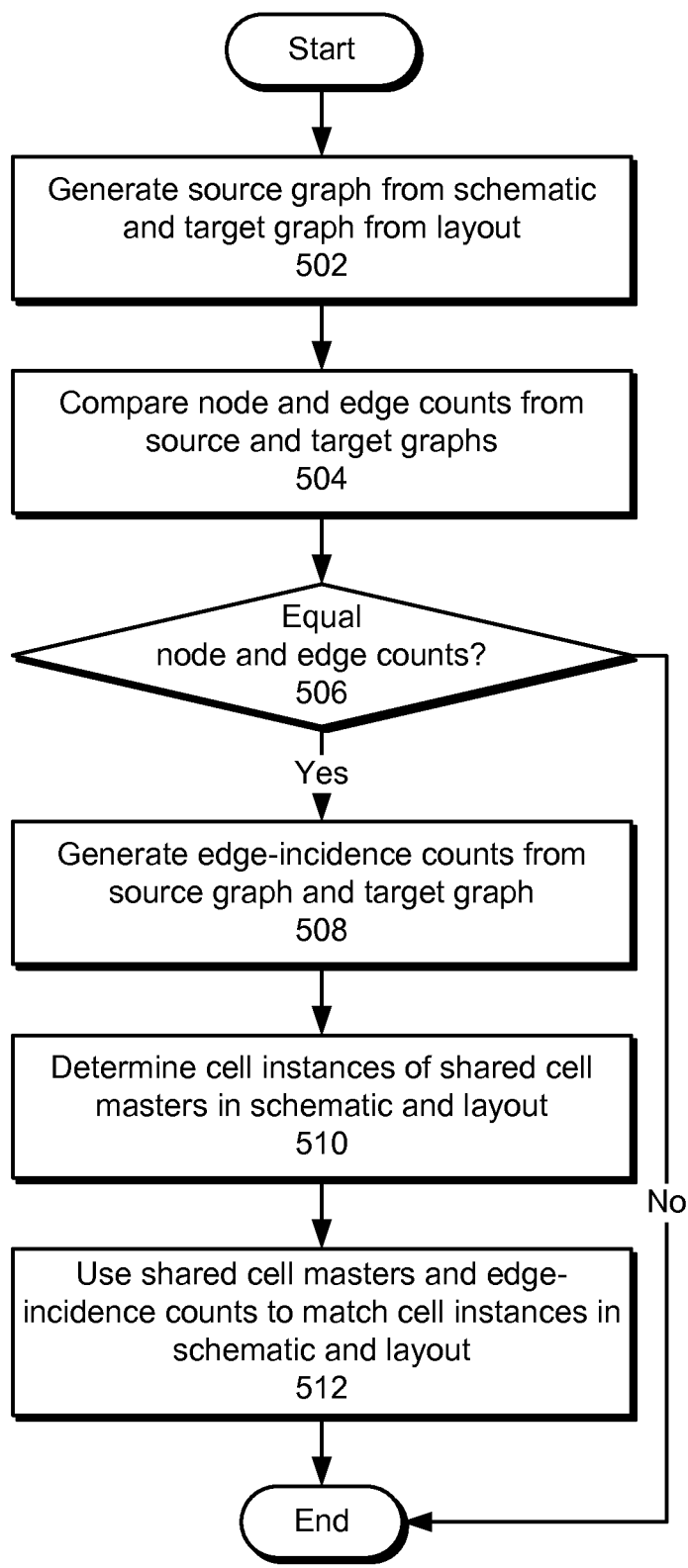
FIG. 5 shows a flowchart illustrating the process of performing a second tier in a tiered comparison of a schematic and a layout in accordance with an embodiment.

FIG. 5 shows a flowchart illustrating the process of performing a second tier in a tiered comparison of a schematic and a layout in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, the second tier generates a source graph from the schematic and a target graph from the layout (operation 502). The source and target graphs may correspond to graph-theoretic representations of the schematic and layout. Consequently, the source and target graphs may contain a number of nodes corresponding to cell instances in the schematic and layout and a number of edges corresponding to connections in the schematic and layout.

Node and edge counts from the source and target graphs are then compared (operation 504) for equality (operation 506). If either the node count (e.g., number of nodes) or the edge count (e.g., number of edges) in the source graph does not equal the corresponding node count or edge count in the target graph, the schematic and layout definitively do not match. If the source and target graphs have equal node and edge counts, edge-incidence counts are generated from the source graph and target graph (operation 508). Each edge-incidence count may represent the number of edges incident on a node. Furthermore, the source and target graphs must have the same distribution of edge-incidence counts to potentially match.

Next, cell instances of shared cell masters in the schematic and layout are determined (operation 510). For example, lists of cell instances that share the same library/cell/view string may be generated for both the schematic and layout. Finally, the shared cell masters and edge-incidence counts may be used to match cell instances in the schematic and layout (operation 512). For example, a match may be found between two cell instances if the masters of the cell instances are two different views of the same OpenAccess library and cell and if the cell instances are the only two cell instances of the library and cell with an edge-incidence count of 9. Mismatches remaining after the second tier may be compared for graph isomorphism in the third tier to fully determine if the schematic and layout match.

Figure 6:
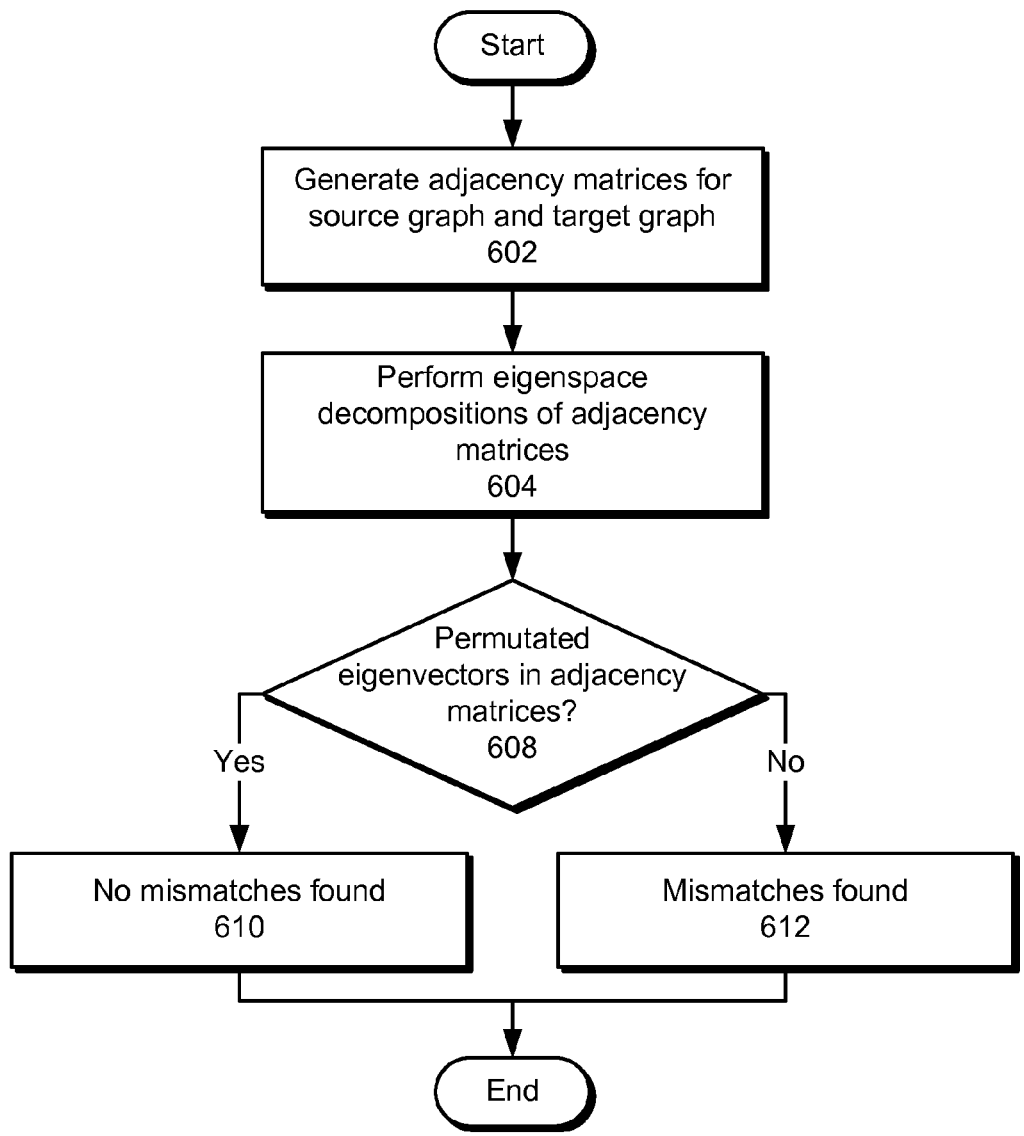
FIG. 6 shows a flowchart illustrating the process of performing a third tier in a tiered comparison of a schematic and a layout in accordance with an embodiment.

FIG. 6 shows a flowchart illustrating the process of performing a third tier in a tiered comparison of a schematic and a layout in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

First, adjacency matrices are generated for a source graph and a target graph (operation 602). The source graph may correspond to a graph-theoretic representation of the schematic, while the target graph may correspond to a graph-theoretic representation of the layout. Next, eigenspace decompositions of the adjacency matrices are performed (operation 602). For example, the Jacobi method, QR method, and/or other polynomial-time technique may be used to perform an eigenspace decomposition of each adjacency matrix. The eigenspace decomposition may further yield a set of eigenvalues and eigenvectors for the adjacency matrix.

The eigenvalues and eigenvectors may then be examined to determine if the adjacency matrices contain permutated eigenvectors (operation 608). In particular, the source and target graphs may be isomorphic if the eigenvectors of the target graph correspond to permutated eigenvectors of the source graph. Furthermore, the permutation of the eigenvectors may match the permutation applied to the nodes of the source graph to create the target graph.

If the adjacency matrices contain permutated eigenvectors of one another, a graph isomorphism exists and no mismatches are found (operation 610) between the schematic and layout. On the other hand, if the adjacency matrices do not have permutated eigenvectors, the source and target graphs are not isomorphic, and hence, mismatches are found (operation 612) between the schematic and layout.

The advantage of the eigenspace decomposition is that it leads to a highly structured matrix computation with known polynomial runtime bounds and quantifiable round-off error behavior. The structured computation is highly amenable to numerical optimization and to parallel acceleration via use of multithreading and multiple processors.

Furthermore, square adjacency matrices arising from graphs are by definition symmetric. Consequently, the matrix is guaranteed to be diagonalizable, and the matrix of right eigenvectors is orthogonal (e.g., the inverse of the matrix equals the transpose). This makes finding the eigenvalues and eigenvectors exceedingly efficient: even graphs with several thousand nodes may be analyzed for graph isomorphism using modest computing hardware, while larger but sparse matrices may utilize specialized eigensolvers with "compressed storage" of the matrices to keep the memory requirements reasonable.

Figure 7:
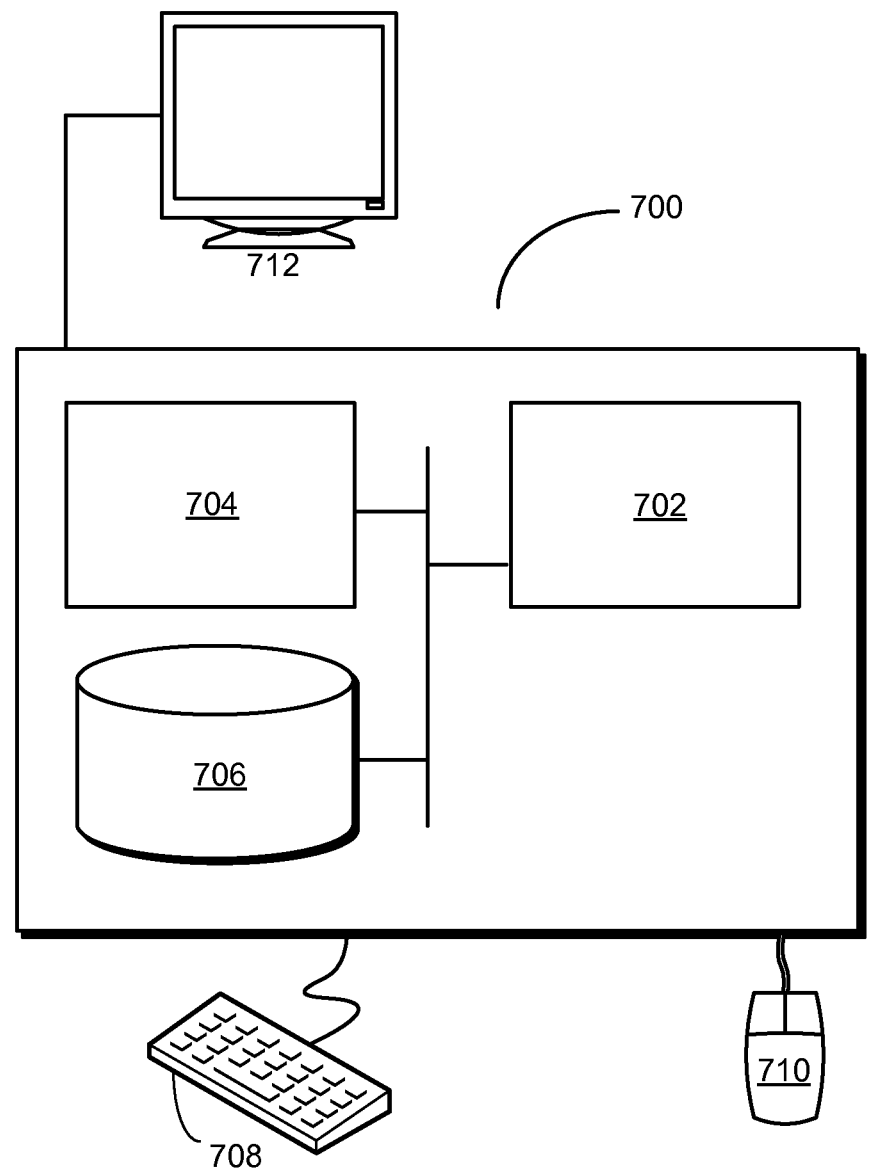
FIG. 7 shows a computer system in accordance with an embodiment.

FIG. 7 shows a computer system 700 in accordance with an embodiment. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating the creation of a layout from a schematic in an EDA application. The system may include a comparison apparatus that performs a tiered comparison of the schematic and the layout. The system may also include a GUI that provides a result of the tiered comparison to a user of the EDA application and enables repairs of mismatches in the result by the user. Finally, the system may include a layout-editing apparatus that automatically generates a portion of the layout from the schematic.

In addition, one or more components of computer system 700 may be remotely located and connected to the other components over a network. Portions of the present embodiments (e.g., GUI, comparison apparatus, layout-editing apparatus, etc.) may also be located on different nodes of a distributed system that implements the embodiments. For example, the present embodiments may be implemented using a cloud computing system that performs SDL and LVS checks using a remote EDA application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating creation of a layout from a schematic in an electronic design automation (EDA) application, comprising:
   performing a tiered comparison of the schematic and the layout, which involves:
      performing a first tier comparison that compares labels in the schematic and the layout;
      in response to detecting no mismatches during the first tier comparison, not performing a second tier comparison that compares first-level connectivity in the schematic and the layout; and
      in response to detecting a mismatch during the first tier comparison, performing the second tier comparison;
   providing a result of the tiered comparison to a user of the EDA application; and
   enabling repairs of mismatches in the result by the user through a graphical user interface (GUI) associated with the EDA application.

2. The computer-implemented method of claim 1, further comprising:
   automatically generating a portion of the layout using the schematic.

3. The computer-implemented method of claim 2, wherein automatically generating the portion of the layout involves:
   automatically placing a component in the layout based at least on an optimization goal associated with the layout.

4. The computer-implemented method of claim 1, wherein enabling repairs of mismatches by the user through the GUI involves at least one of:

enabling automatic correction of the mismatches through the GUI; and marking the mismatches in the layout.

5. The computer-implemented method of claim 1, wherein the first tier comparison involves:

comparing components in the schematic and the layout using at least one of a component name, a terminal set, and a signal net.

6. The computer-implemented method of claim 1, wherein the second tier comparison involves at least one of:

generating a source graph from the schematic and a target graph from the layout;

comparing node counts and edge counts from the source graph and the target graph;

comparing edge-incidence counts from the source graph and the target graph; and using shared cell masters and the edge-incidence counts to match cell instances in the schematic and the layout.

7. The method of claim 1, wherein performing the tiered comparison of the schematic and the layout further involves, in response to detecting a mismatch during the second tier comparison, performing a third tier comparison that determines a graph isomorphism between the schematic and the layout.

8. The computer-implemented method of claim 1, wherein the tiered comparison is a full comparison or an incremental comparison.

9. A system for facilitating creation of a layout from a schematic in an electronic design automation (EDA) application, comprising:

a comparison apparatus configured to perform a tiered comparison of the schematic and the layout by:

performing a first tier comparison that compares labels in the schematic and the layout;

in response to detecting no mismatches during the first tier comparison, not performing a second tier comparison that compares first-level connectivity in the schematic and the layout; and in response to detecting a mismatch during the first tier comparison, performing the second tier comparison;

a GUI configured to:

provide a result of the tiered comparison to a user of the EDA application; and enable repairs of mismatches in the result by the user.

10. The system of claim 9, further comprising:

a layout-editing apparatus configured to automatically generate a portion of the layout using the schematic.

11. The system of claim 10, wherein automatically generating the portion of the layout involves:

automatically placing a component in the layout based at least on an optimization goal associated with the layout.

12. The system of claim 9, wherein enabling repairs of mismatches by the user through the GUI involves at least one of:

enabling automatic correction of the mismatches through the GUI; and marking the mismatches in the layout.

13. The system of claim 9, wherein the first tier comparison involves:

comparing components in the schematic and the layout using at least one of a component name, a terminal set, and a signal net.

14. The system of claim 9, wherein the second tier comparison involves at least one of:

generating a source graph from the schematic and a target graph from the layout;

comparing node counts and edge counts from the source graph and the target graph;

comparing edge-incidence counts from the source graph and the target graph; and using shared cell masters and the edge-incidence counts to match cell instances in the schematic and the layout.

15. The system of claim 9, wherein the tiered comparison is a full comparison or an incremental comparison.

16. The system of claim 9, wherein the comparison apparatus is further configured to perform a third tier comparison that determines a graph isomorphism between the schematic and the layout in response to detecting a mismatch during the second tier comparison.

17. A non-transitory computer-readable storage medium storing instructions that when executed by a computer cause the computer to perform a method for facilitating creation of a layout from a schematic in an electronic design automation (EDA) application, the method comprising:

performing a tiered comparison of the schematic and the layout, which involves:

performing a first tier comparison that compares labels in the schematic and the layout;

in response to detecting no mismatches during the first tier comparison, not performing a second tier comparison that compares first-level connectivity in the schematic and the layout; and in response to detecting a mismatch during the first tier comparison, performing the second tier comparison;

providing a result of the tiered comparison to a user of the EDA application; and enabling repairs of mismatches in the result by the user through a graphical user interface (GUI) associated with the EDA application.

18. The non-transitory computer-readable storage medium of claim 17, the method further comprising:

automatically generating a portion of the layout using the schematic.

19. The non-transitory computer-readable storage medium of claim 18, wherein automatically generating the portion of the layout involves:

automatically placing a component in the layout based at least on an optimization goal associated with the layout.

20. The non-transitory computer-readable storage medium of claim 17, wherein enabling repairs of mismatches by the user through the GUI involves at least one of:

enabling automatic correction of the mismatches through the GUI; and marking the mismatches in the layout.

21. The non-transitory computer-readable storage medium of claim 17, wherein the first tier comparison involves:

comparing components in the schematic and the layout using at least one of a component name, a terminal set, and a signal net.

22. The non-transitory computer-readable storage medium of claim 17, wherein the second tier comparison involves at least one of:

generating a source graph from the schematic and a target graph from the layout;

comparing node counts and edge counts from the source graph and the target graph;

comparing edge-incidence counts from the source graph and the target graph; and using shared cell masters and the edge-incidence counts to match cell instances in the schematic and the layout.

23. The non-transitory computer-readable storage medium of claim 17, wherein the tiered comparison is a full comparison or an incremental comparison.

24. The non-transitory computer-readable storage medium of claim 17, wherein performing the tiered comparison of the schematic and the layout further involves, in response to detecting a mismatch during the second tier comparison, performing a third tier comparison that determines a graph isomorphism between the schematic and the layout.

\* \* \* \* \*